US012811909B1

(12) United States Patent
Tang et al.

(10) Patent No.: US 12,811,909 B1
(45) Date of Patent: Nov. 24, 2026

(54) NETWORKING DISTRIBUTED APPLICATIONS HOSTED AT CLOUD PROVIDER NETWORK EDGE LOCATIONS

(71) Applicant: Amazon Technologies, Inc., Seattle, WA (US)

(72) Inventors: Felix Chun Lap Tang, Bellevue, WA (US); Jacob Mason, Redmond, WA (US); Han Bai, Newcastle, WA (US); Sourav Roy, Sunnyvale, CA (US); Robin Alan Golden, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 235 days.

(21) Appl. No.: 17/955,167

(22) Filed: Sep. 28, 2022

(51) Int. Cl.

| | |
|---|---|
| ***H04L 9/40*** | (2022.01) |
| ***H04L 12/66*** | (2006.01) |
| ***H04L 45/745*** | (2022.01) |
| ***H04L 61/5061*** | (2022.01) |

(52) U.S. Cl.
CPC .......... *H04L 63/0209* (2013.01); *H04L 12/66* (2013.01); *H04L 45/745* (2013.01); *H04L 61/5061* (2022.05); *H04L 63/0272* (2013.01)

(58) Field of Classification Search
None
See application file for complete search history.

(56) References Cited

U.S. PATENT DOCUMENTS

| | | | | |
|---|---|---|---|---|
| 10,348,767 | B1 * | 7/2019 | Lee | H04L 63/0236 |
| 10,491,516 | B2 * | 11/2019 | Ram | H04L 45/586 |
| 11,470,182 | B1 * | 10/2022 | Virtser | H04L 67/56 |
| 11,588,731 | B1 * | 2/2023 | Teng | H04L 61/2514 |
| 12,375,449 | B2 * | 7/2025 | Cometto | H04L 63/0263 |
| 2012/0281706 | A1 * | 11/2012 | Agarwal | H04L 12/4633 370/395.53 |
| 2014/0230044 | A1 * | 8/2014 | Liu | H04L 41/28 726/15 |

(Continued)

OTHER PUBLICATIONS

Y. Zhao, W. Wang, Y. Li, C. Colman Meixner, M. Tornatore and J. Zhang, "Edge Computing and Networking: A Survey on Infrastructures and Applications," in IEEE Access, vol. 7, pp. 101213-101230, 2019, doi: 10.1109/ACCESS.2019.2927538. (Year: 2019).*

*Primary Examiner* — Rupal Dharia
*Assistant Examiner* — Shadi H Kobrosli
(74) *Attorney, Agent, or Firm* — Nicholson DeVos Webster & Elliott LLP

(57) ABSTRACT

Techniques for networking distributed applications hosted at cloud provider network edge locations are described. A first instance is launched at a first edge location of a cloud provider network, the first edge location deployed within a customer network and including a first local gateway. A second instance is launched at a second edge location of the cloud provider network, the second edge location deployed within the customer network and including a second local gateway. Route tables associated the virtual private cloud are updated with entries to direct traffic between the instances via the customer network. Traffic from the first instance to the second instance is sent from the first local gateway to the second local gateway through the customer network.

20 Claims, 9 Drawing Sheets

(56) References Cited

U.S. PATENT DOCUMENTS

| | | | | |
|---|---|---|---|---|
| 2014/0280595 | A1* | 9/2014 | Mani | H04L 67/10 709/204 |
| 2015/0128245 | A1* | 5/2015 | Brown | H04L 69/30 709/238 |
| 2019/0158537 | A1* | 5/2019 | Miriyala | G06F 21/606 |
| 2020/0177489 | A1* | 6/2020 | Zeng | H04L 45/745 |
| 2022/0327003 | A1* | 10/2022 | Shankar | H04L 41/5051 |
| 2022/0329578 | A1* | 10/2022 | Becker | C07K 16/2803 |
| 2022/0337679 | A1* | 10/2022 | Cook | H04L 67/12 |
| 2023/0195444 | A1* | 6/2023 | Vohra | G06F 9/455 717/172 |
| 2023/0224223 | A1* | 7/2023 | Brar | G06F 16/9014 370/254 |
| 2024/0036934 | A1* | 2/2024 | Vasanad | G06F 8/61 |
| 2024/0126581 | A1* | 4/2024 | Nguyen | G06F 9/45558 |
| 2024/0348541 | A1* | 10/2024 | Brar | G06F 9/5077 |
| 2025/0016029 | A1* | 1/2025 | Miriyala | H04L 12/4641 |
| 2025/0208895 | A1* | 6/2025 | Wu | G06F 9/45558 |

* cited by examiner

NETWORKING DISTRIBUTED APPLICATIONS HOSTED AT CLOUD PROVIDER NETWORK EDGE LOCATIONS

BACKGROUND

Cloud computing platforms often provide on-demand, managed computing resources to customers. Such computing resources (e.g., compute and storage capacity) are often provisioned from large pools of capacity installed in data centers. Customers can request computing resources from the "cloud," and the cloud can provision compute resources to those customers. Technologies such as virtual machines and containers are often used to allow customers to securely share capacity of computer systems.

BRIEF DESCRIPTION OF DRAWINGS

Various examples in accordance with the present disclosure will be described with reference to the drawings, in which.

DETAILED DESCRIPTION

Figure 1:
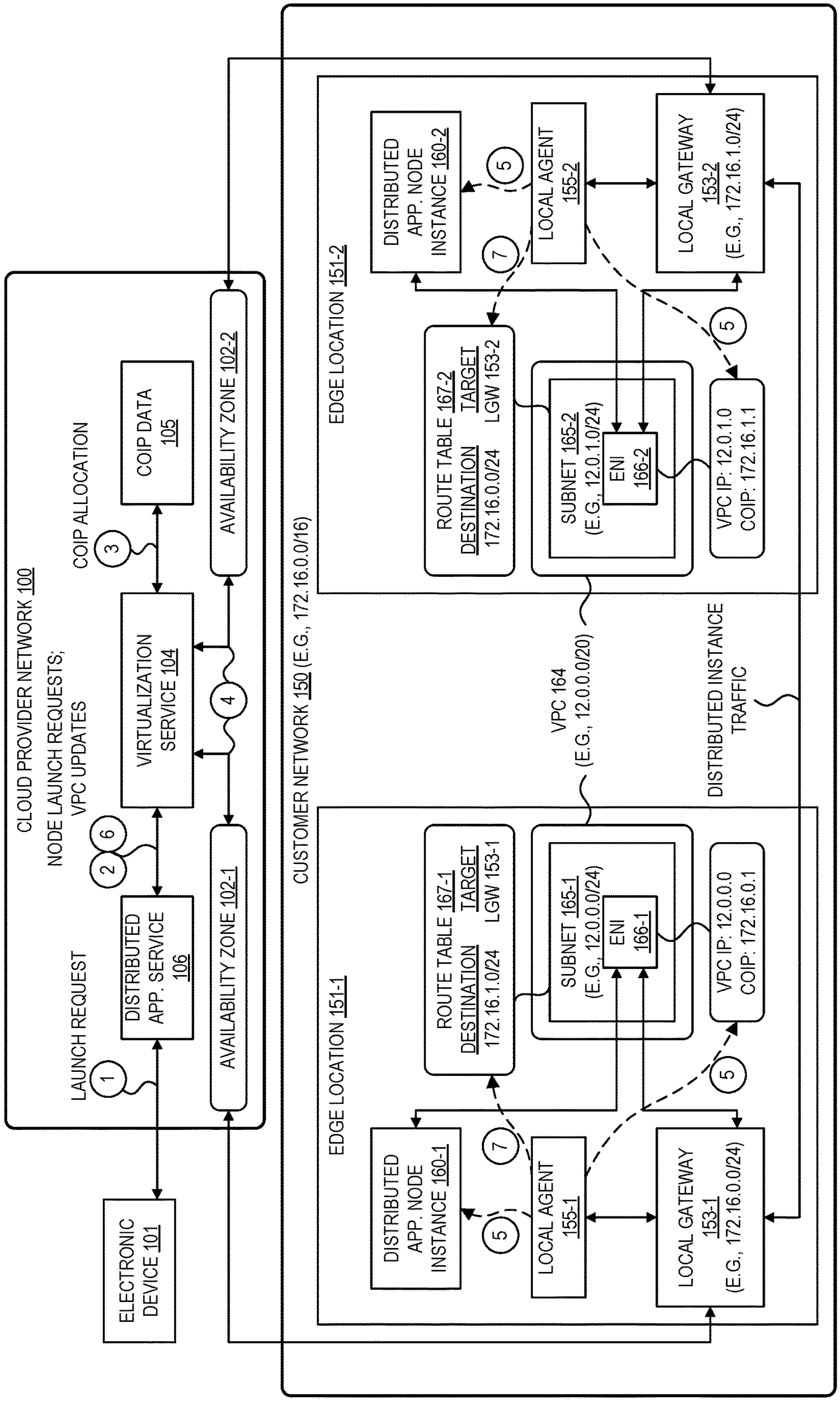
FIG. 1 is a diagram illustrating an environment for facilitating inter-edge location distributed application communications according to some examples.

The present disclosure relates to methods, apparatus, systems, and non-transitory computer-readable storage media for facilitating cloud provider network edge location communications via a network other than the cloud provider network. According to some examples, a service of a cloud provider network can deploy distributed applications within edge locations of the cloud provider network such that the nodes of the distributed application can communicate via a network other than the cloud provider network-commonly a customer's network into which edge locations have been deployed. Exemplary distributed applications include distributed computing applications (e.g., cluster computing) and distributed storage applications (e.g., distributed databases).

A cloud provider network, or "cloud," refers to a large pool of network-accessible computing resources (such as compute, storage, and networking resources, applications, and services). The cloud can provide convenient, on-demand network access to a shared pool of configurable computing resources that can be programmatically provisioned and released in response to customer commands. Cloud computing can thus be considered as both the applications delivered as services over a publicly accessible network (e.g., the Internet, a cellular communication network) and the hardware and software in cloud provider data centers that provide those services. Some customers may desire to use the resources and services of such cloud provider networks, but for various reasons (e.g., latency in communications with customer devices, legal compliance, security, or other reasons) prefer for these resources and services to be provisioned within their own network (for example on premises of the customer), at a separate network managed by the cloud provider, within a network of a communications service provider, or within another independent network.

Edge locations (ELs) (sometimes referred to as "provider substrate extensions" (PSEs)) represent segments of the cloud provider network that can be deployed within a network that is separate from the cloud provider network. A cloud provider network typically includes a physical network (e.g., sheet metal boxes, cables, rack hardware) referred to as the substrate. The substrate can be considered as a network fabric containing the physical hardware that runs the services of the provider network. In some examples, an EL may be an extension of the cloud provider network substrate formed by one or more servers located on-premises in a customer or partner facility, in a separate cloud provider-managed facility, in a communications service provider facility, or in any other type of facility including servers where such server(s) communicate over a network (e.g., a publicly-accessible network such as the Internet) with a nearby availability zone or region of the cloud provider network. Customers may access a provider substrate extension via the cloud provider substrate or another network and may use the same application programming interfaces (APIs) to create and manage resources in the EL as they would use to create and manage resources in the region of a cloud provider network.

Various requirements have made deploying distributed applications that communicate amongst ELs challenging. For example, standards-, regulatory-, and/or customer-imposed data residency requirements might prohibit distributed applications from executing across edge locations where communications are routed through the cloud provider network. At the same time, customers lacking networking and/or software development know-how might be limited to a default "hub-and-spoke" communications topology in which communications between edge locations traverse the cloud provider network (the "hub") and thus unable to migrate their distributed applications into on-prem managed ELs. Besides data-residency requirements, such a communications topology might be unable to meet a customer's needs, particularly for high-availability, high-durability applications such as distributed databases. Furthermore, even if a customer had the know-how to develop a proprietary inter-edge location communications solution independent of the cloud provider network, the customer must then assume the costs associated with maintaining that solution. Examples described herein address these and other challenges by providing a managed deployment of a distributed application across ELs with inter-application node communications via a network other than the cloud provider network.

FIG. 1 is a diagram illustrating an environment for facilitating inter-edge location distributed application communications according to some examples. A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc.

These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 using an electronic device 101 communicating across one or more intermediate networks (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code-typically without the user having any control of or knowledge of the underlying compute instance(s) involved.

One advantage of cloud provider networks is their provisioning of managed services that allow users to easily deploy applications. For example, one type of managed service that a provider network may provide may be referred to as a "managed compute service" that executes code or provides computing resources for its users in a managed configuration. Examples of managed compute services include, for example, an on-demand code execution service, a hardware virtualization service, a container service, or the like. Other types of managed services include managed storage services to provide databases, data backups, object storage, block storage, or the like.

A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time. In the illustrated example cloud provider network 100, the cloud provider network 100 includes two availability zones: availability zone 102-1 and availability zone 102-2.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs.

Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

A cloud provider network can include a physical network (e.g., sheet metal boxes, cables) referred to as the substrate. The cloud provider network can also include an overlay network of virtualized computing resources that run on the substrate. As such, network packets can be routed along a substrate network according to constructs in the overlay network (e.g., virtual private networks, virtual firewalls, and the like). A mapping service can coordinate the routing of these network packets. The mapping service can be a regional distributed look up service that maps the combination of overlay IP address and network identifier to a substrate IP address so that the distributed substrate computing devices can look up where to send packets.

One example of a network overlay is a virtual private cloud (VPC). A VPC (also referred to as an "isolated virtual network" or "private cloud") is a virtual network of computing resources managed by a cloud provider network that is logically isolated from other resources or virtual private clouds managed by the cloud provider network (e.g., other virtual private clouds associated with a same user and different users of the cloud provider network). An elastic network interface (ENI) is a logical networking component in a VPC that represents a virtual network card. An ENI links virtualized resources or instances to a VPC. From the perspective of an instance, for example, an ENI is an attached network devices (e.g., a network device to the operating system of the instance). Instances can have multiple attached ENIs to facilitate communications in multiple VPCs.

To illustrate the relation between overlay networks and the substrate, each physical host can have an IP address in the substrate network. Hardware virtualization technology can enable multiple operating systems to run concurrently on a host computer, for example as VMs on the host. A hypervisor, or virtual machine monitor (VMM), on a host allocates the host's hardware resources amongst various VMs on the host and monitors the execution of the VMs. Each VM can be provided one or more IP addresses in the overlay network, and the VMM on a host can be aware of the IP addresses of the virtual machines on the host. The VMMs (and/or other devices or processes on the network substrate) can use encapsulation protocol technology to encapsulate and route network packets (e.g., client IP packets) over the network substrate between virtualized resources on different hosts within the cloud provider network. The encapsulation protocol technology can be used on the network substrate to route encapsulated packets between endpoints on the network substrate via overlay network paths or routes. The encapsulation protocol technology can be viewed as providing a virtual network topology overlaid on the network substrate. The encapsulation protocol technology can include the mapping service that maintains a mapping directory that maps IP overlay addresses to substrate IP addresses, which can be accessed by various processes on the cloud provider network for routing packets between endpoints.

Edge locations installed outside of the cloud provider network are typically connected to an AZ of the provider network via a secure tunnel or direct connection to the AZ. Once connected, an EL may be considered "homed" with a particular AZ. Users can then interact with managed services of the cloud provider network to launch virtualized compute, storage, or other resources on the EL via the cloud provider network. In the illustrated example, edge location 151-1 and edge location 151-2 have been sited within a customer network 150. The customer network 150 has an Internet Protocol (IP) address block (or "CIDR" block) of 172.16.0.0/16. Edge location 151-1 has been connected to (or "homed" with) AZ 102-1, and edge location 151-2 has been connected to AZ 102-2.

As part of deploying an edge location within their network, a customer typically provides the cloud provider network with one or more ranges of customer-owned IP ("COIP") addresses. The customer typically submits the COIP address range(s) via an API call to a virtualization service 104 of the cloud provider network. Virtualization service 104 may be one or more services of the cloud provider network 100 that manage virtualized resources. Such management can include operations such as launching a virtualized resource, configuring a virtualized resource, and terminating a virtualized resource. The virtualization service 104 stores the COIP address range(s) in COIP data 105 and can allocate addresses from the COIP address ranges to virtualized resources launched in an edge location. For example, if the customer launches a web server within an edge location, the virtualization services can allocate a COIP address to that web server such that other devices (not shown) within the customer network 150 can access that web server via the allocated COIP address.

Edge locations typically include a local gateway and a local agent. A local gateway typically provides a target in VPC route tables for on-premises destined traffic from an edge location and can further perform network address translation (NAT) for instances that have been assigned addresses from the COIP address pool. A local agent provides an endpoint for managed services of the cloud provider network to manage virtualized resources on their respective edge location 151. Management operations of the local agent can include, for example, configuring and launching instances and terminating instances. In the illustrated environment, edge location 151-1 includes a local gateway 153-1 and a local agent 155-1. Edge location 151-2 includes a local gateway 153-2 and a local agent 155-2.

In establishing a connection with the cloud provider network 100, edge locations are allocated a range of COIP addresses. In the illustrated example, the edge location 151-1 has been allocated the range 172.16.0.0/24 (as indicated in the local gateway 153-1), while the edge location 151-2 has been allocated the range 172.16.1.0/24 (as indicated in the local gateway 153-2). The local gateways can exchange routing information such as via the Border Gateway Protocol (BGP) so that the local gateway 153-1 can know to route packets directed to the 172.16.1.0/24 range to the local gateway 153-2, and the local gateway 153-2 can know to route packets directed the 172.16.0.0/24 range to the local gateway 153-1. Continuing the above web server example, a web server launched using resources of the edge location 151-1 would have a COIP address allocated from the associated range allocated to the edge location 151-1 (e.g., within 172.16.0.0/24), while a web server launched using resources of the edge location 151-2 would have a COIP address allocated from the associated range allocated to the edge location 151-2 (e.g., within 172.16.1.0/24).

An example workflow of launching and configuring a distributed application across ELs with inter-EL communications outside of the cloud provider network 100 is now described with reference to the circled numbers 1-5 illustrated in FIG. 1. The operations in this example workflow are typically facilitated by APIs vended by the respective services. As indicated at circle 1, a customer can submit a request via the electronic device 101 to a distributed application service 106 (e.g., a managed service) to launch a distributed application. The request can include an implicit or explicit configuration of the distributed application. The configuration of the distributed application can include a number of nodes, roles of certain nodes (e.g., primary or secondary or the like as determined by the particular distributed application), and the locations to launch the nodes. For example, the request can identify the instance locations by identifying VPC subnets previously associated with ELs. The distributed application service 106 can infer the ELs on which to launch the distributed application nodes based on those VPC subnet to EL associations. As another example, the request can identify the node locations by including an identifier of each EL on which to launch a distributed application node. In this example, the request implicitly or explicitly identified a two-node application, with EL 151-1 hosting one node and EL 151-2 hosting the other node.

Upon receiving the request, the distributed application service 106 can process the request to manage the launch of the distributed application. Such may be the case when the virtualization service 104 handles requests to launch single instances. The distributed application service deconstructs the request to launch the distributed application into multiple requests to launch the individual application nodes. Continuing the above example, if the received request includes an indication that the distributed application will launch with two nodes, the distributed application service 106 can generate a request to launch each node and send those requests to the virtualization service 104 as indicated at circle 2. Such requests can include an indication of a machine image from which to launch the instance, the network configuration including any ENIs to attach to the instance, and an implicit or explicit identification of the EL on which to launch the instance (e.g., either via VPC subnet or EL identifier).

Inter-EL application node traffic typically is handled by a VPC with subnets associated with each EL in the distributed application cluster. As illustrated in FIG. 1, the VPC 164 having an address block of 12.0.0.0/20 handles inter-EL application node traffic. A subnet 165-1 of VPC 164 having an address block of 12.0.0.0/24 is associated with the EL 151-1, and a subnet 165-2 of VPC 164 having an address block of 12.0.1.0/24 is associated with the EL 151-2.

Figure 3:
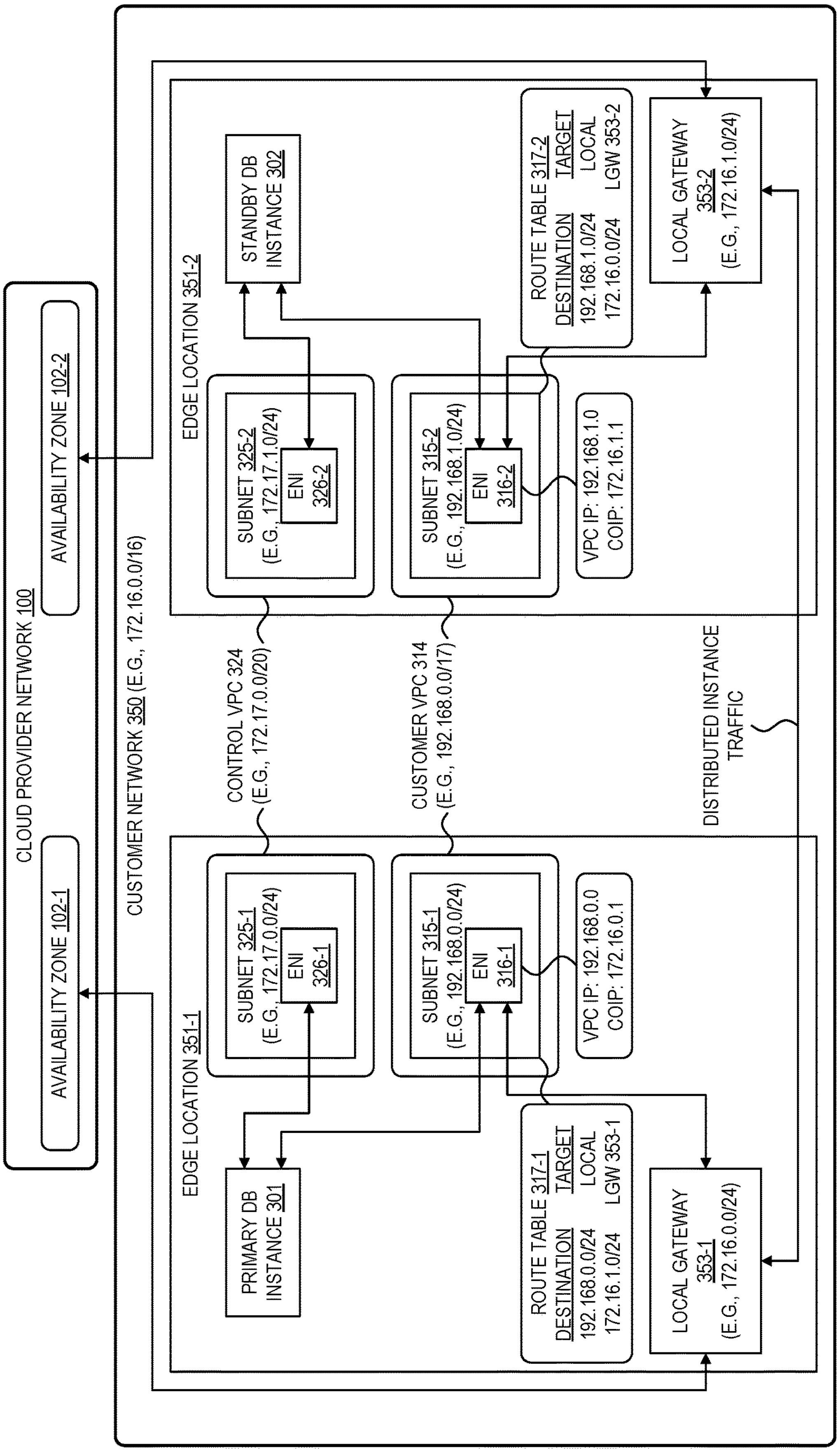
FIG. 3 is a diagram illustrating an environment for inter-edge location distributed application communications via a customer's VPC according to some examples.

In some examples, the customer creation of VPC 164 is a prerequisite to the launch request at circle 1. The customer can submit one or more requests to the virtualization service 104 to create the VPC 164 and the subnets 165 and to associate the subnets 165 with the respective edge locations 151. The virtualization service 104 can track the customer-created VPC and subnets in networking data (not shown). Networking data can include associations between owners (whether customers or other services) and VPCs, between VPCs and VPC subnetworks, between VPC subnetworks and ELs, and between VPCs and attached instances (e.g., via ENI). Each of these entities is typically tracked by identifier (e.g., owner identifiers, VPC identifiers, VPC subnetwork identifiers, instance identifiers, etc. FIG. 3 illustrates an example environment in which a customer-created and managed VPC is used for inter-node traffic.

Figure 4:
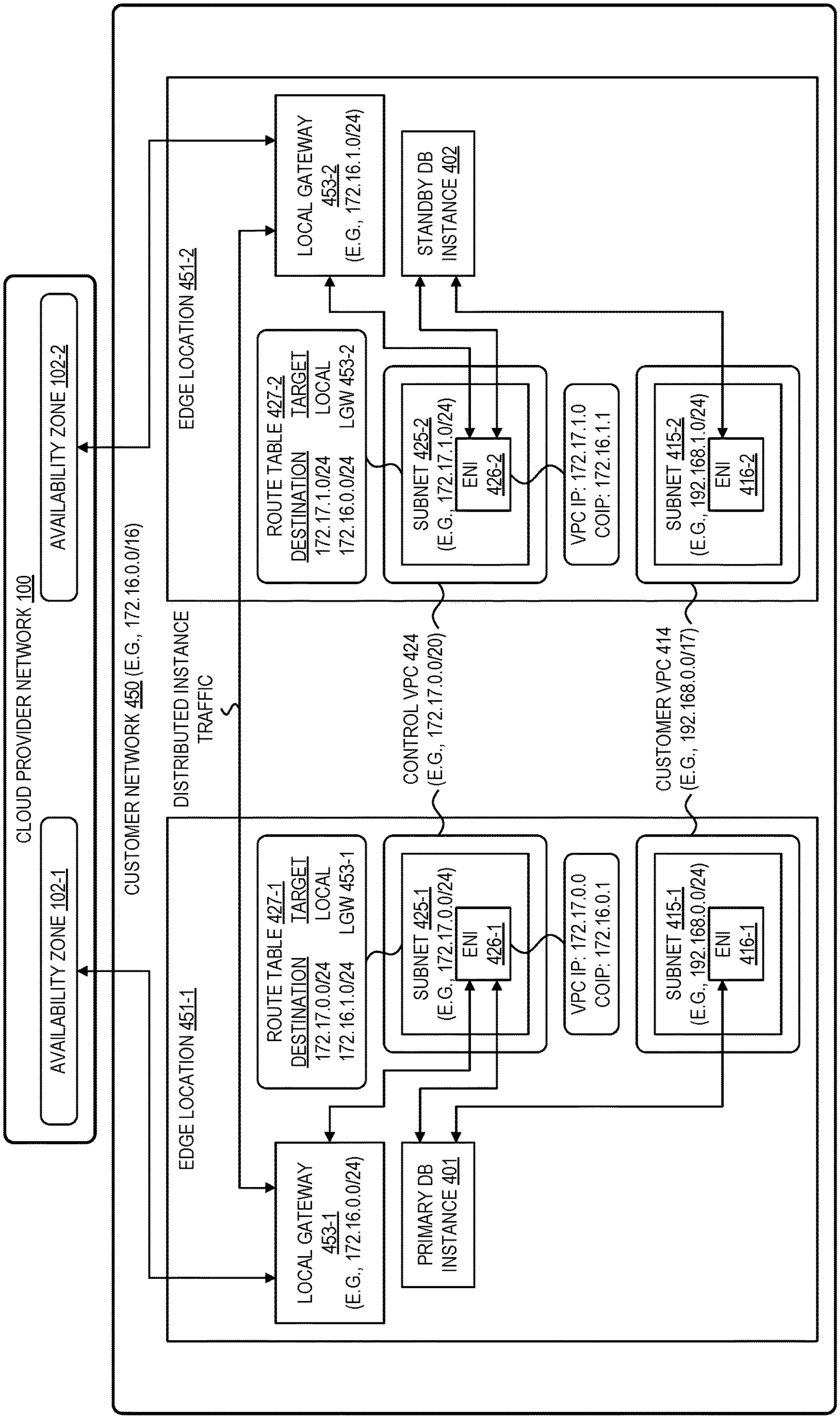
FIG. 4 is a diagram illustrating an environment for inter-edge location distributed application communications via a service-owned control VPC according to some examples.
Figure 5:
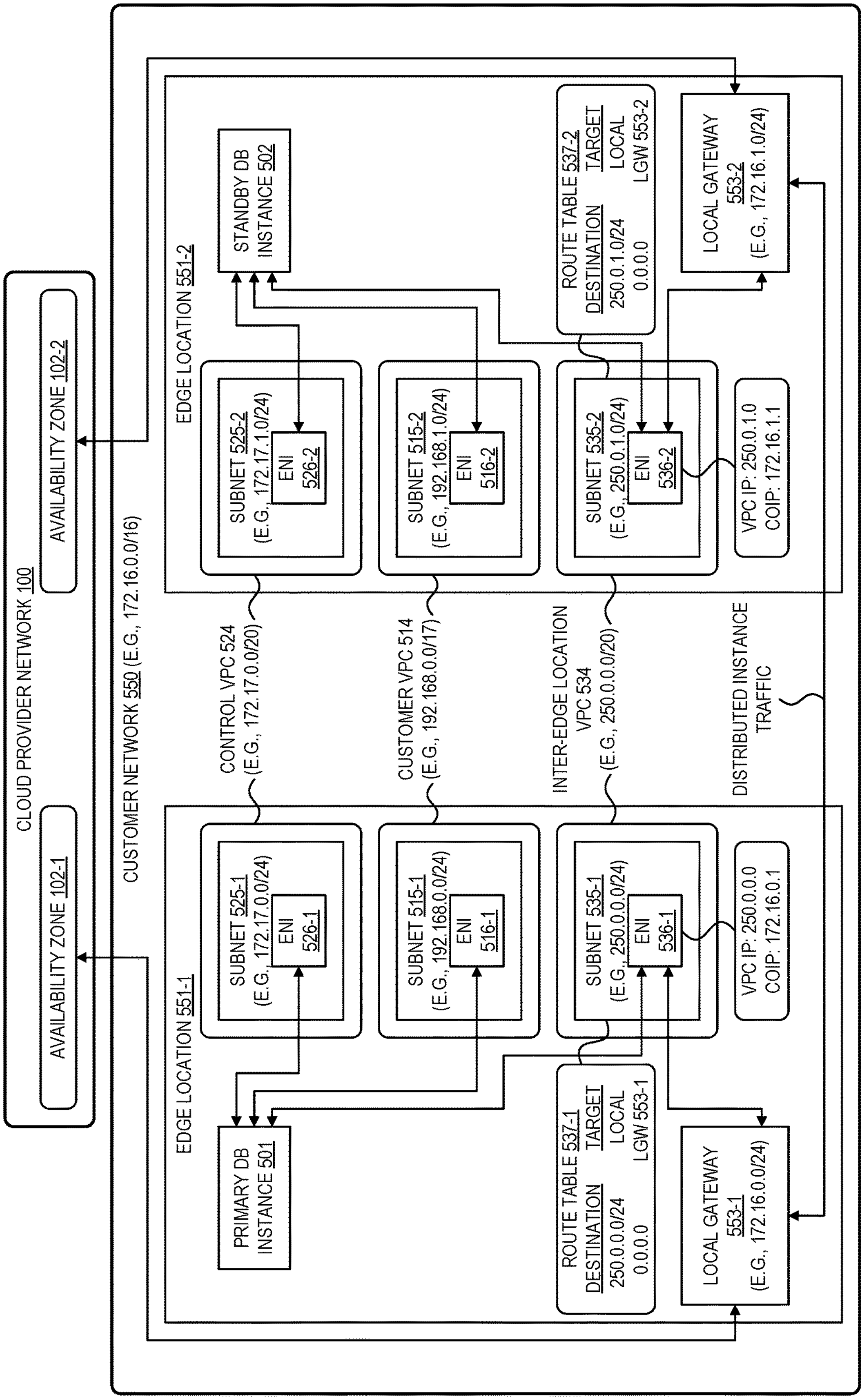
FIG. 5 is a diagram illustrating an environment for inter-edge location distributed application communications via a service-owned inter-edge location virtual private cloud (VPC) according to some examples.

In other examples, the VPC 164 is created and managed by the distributed application service 106 as part of launching the cluster or enabling inter-EL communications outside of the cloud provider network 100. In such a case, the distributed application service 106 can submit one or more requests to the virtualization service 104 to create the VPC 164 and the subnets 165 and to associate the subnets 165 with the respective edge locations 151. The virtualization service 104 can track the service-created VPC and subnets in the networking data. FIGS. 4 and 5 illustrate example environments in which a service-managed VPC is used for inter-node traffic.

As indicated at circle 3, the virtualization service 104 can allocate IP addresses from the COIP data 105 for association with nodes in the distributed cluster by the distributed application service 106. The distributed application service 106 can assign allocated COIP addresses to instances in the cluster as part of providing network configuration data to the virtualization service 104.

At circle 4, the virtualization service 104 sends one or more requests to a local agent that manages the virtualized resources on an edge location to configure and launch the requested instance. Such requests can include an identification of a machine image from which to launch the instance, resources allocations to make for the instance (e.g., processor, memory), and network configuration data, including any ENIs to attach to the instance to provide communications to VPCs. Continuing the two-node example above, the virtualization service 104 can send one or more requests to the agent 155-1 of EL 151-1 to launch and configure the distributed application node instance 160-1. Likewise, the virtualization service 104 can send one or more requests to the agent 155-2 of EL 151-2 to launch and configure the distributed application node instance 160-2. As illustrated, the instance 160-1 is attached to the ENI 166-1 with an assigned COIP address allocation of 172.16.0.1, and the instance 160-2 is attached to the ENI 166-2 with an assigned COIP address allocation of 172.16.1.1.

As indicated at circle 5, upon receiving the requests to configure and launch an instance, the local agent allocates resources of the edge location (e.g., a processor core of a processor, a portion of memory accessible by that processor) and launches the instance, attaching one or more ENIs to the instance. Continuing the above example, the local agent 155-1 configures and launches the distributed application node instance 160-1, including attaching ENI 166-1 to provide the instance 160-1 with connectivity to VPC 164. The local agent 155-1 configures the ENI 166-1 to have the allocated 172.16.0.1 COIP address. Likewise, the local agent 155-2 configures and launches the distributed application node instance 160-2, including attaching ENI 166-2 to provide the instance 160-2 with connectivity to VPC 164. The local agent 155-2 configures the ENI 166-2 to have the allocated 172.16.1.1 COIP address.

As indicated at circle 6, the distributed application service 106 sends the virtualization service 104 a request to update the VPC routing data for subnet 165-1 and a request to update the VPC routing data for subnet 165-2. The requests are to add entries to VPC 164 route tables to route of traffic originating from distributed application node instances 160 destined to COIP addresses onto the customer network 150 via the respective local gateways 153. For example, the route addition request for route table 167-1 includes an entry with destination addresses 172.16.1.0/24 and target "LGW 153-1" (a placeholder for the network address assigned to that local gateway), and the route addition request for route table 167-2 includes an entry with destination addresses 172.16.0.0/24 and target "LGW 153-2" (a placeholder for the network address assigned to that local gateway). As indicated at circle 7, the local agent 155-1 can update the route table 167-1 associated with the subnet 165-1 to include a route for other distributed application node instances 160 on other ELs via the LGW 153-1. Similarly, the local agent 155-2 can update the route table 167-2 associated with the subnet 165-2 to include a route for other distributed application node instances 160 on other ELs via the LGW 153-2. Note that the route tables illustrated here and in the other figures can include additional entries besides those illustrated.

While the above example workflow combines the launch and configuration of the distributed application, another example workflow can be used to configure an existing distributed application deployment for inter-EL communications outside of the cloud provider network 100. In such a case, an abbreviate workflow can include, by the distributed application service 106, initiating the creation of a new VPC (if not using an existing one), the attaching ENIs to the existing instances to communicate with that new VPC (if applicable), the updating the route tables with routes onto the customer network via the local gateways, and the updating of the distributed application node instances themselves with node network address information reflecting COIP rather than VPC addresses (e.g., to allow the applications to address packets using COIP addresses rather than VPC addresses).

Note that although the example illustrated in FIG. 1 shows a distributed application spanning edge locations 151-1 and 151-2 that are respectively homed to AZs 102-1 and 102-2, in other examples a distributed application can be hosted across edge locations homed to the same AZ. Similarly, although the example illustrated in FIG. 1 shows the inter-distributed application node traffic traversing the customer network, in other examples, a customer's network may be linked between multiple sites (e.g., via virtual private network) having ELs, and thus traffic between nodes may traverse a third-party network (e.g., communications service provider(s) or other carrier(s) providing the communications infrastructure between customer network sites).

In some examples, distributed application traffic is encrypted prior to exiting an edge location hosting the source of the application traffic and decrypted after entering an edge location hosting the destination of the application traffic. For example, a secure tunnel can be established between distributed application traffic endpoints or endpoint-pairs. The IPsec framework is one tool for securing such communications. In some examples, the endpoints of the tunnel may be the distributed application nodes themselves. In other examples, the local gateways of the ELs can establish tunnels for application traffic traversing the VPC subnet (e.g., between local gateway pairs).

Figure 2:
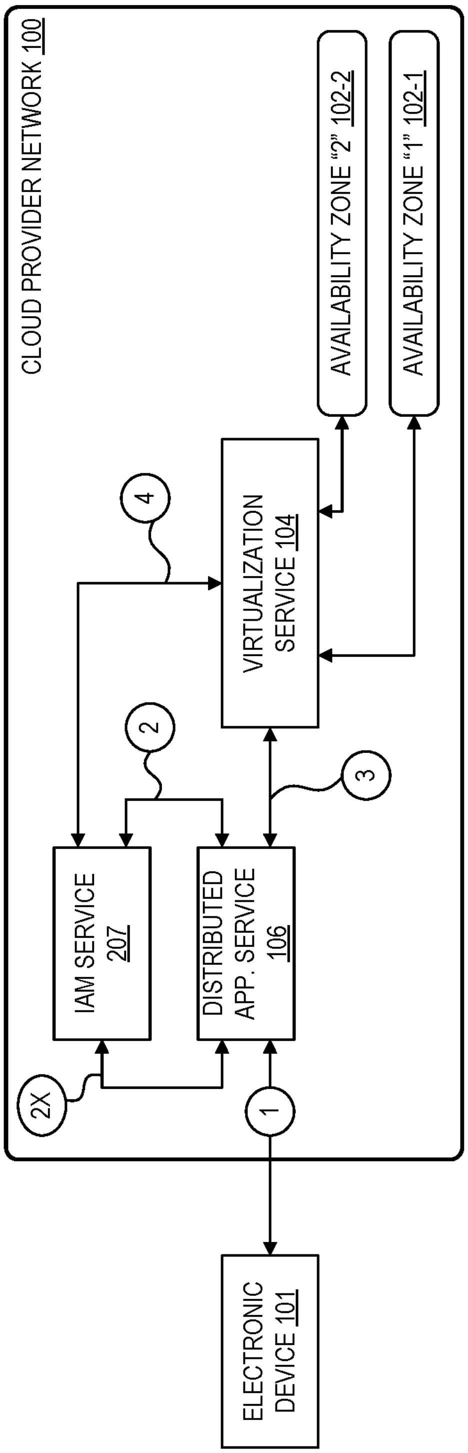
FIG. 2 is a diagram illustrating a permissions approach for inter-edge location distributed application communications according to some examples.

FIG. 2 is a diagram illustrating a permissions approach for inter-edge location distributed application communications according to some examples. To facilitate the managed deployment of inter-application node communications via a network other than the cloud provider network, the distributed application service 106 can gain permissions to act on behalf of the customer to perform operations such as modifying the route tables of a customer-owned VPC or obtain IP addressed from the customer-owned COIP pool. An example set of operations related to permissions is described below with reference to circled numbers 1-4 illustrated in FIG. 2. As before, these operations are typically facilitated by a APIs vended by the respective services. At circle 1, a customer can submit a request to the distributed application service 106 to launch a new cluster or configure an existing cluster with inter-application node communications via a network other than the cloud provider network, such as described above.

At circle 2, the distributed application service 106 sends a request to an IAM service 207 to assume a role within the customer's access controls. The IAM service 207 allows customers to securely control access to cloud provider network resources, including controlling who is authenticated (e.g., signed in) and authorized (e.g., has permissions) to use resources. One exemplary request to assume a role is shown below.

```
aws sts assume-role
    --role-arn <ROLE-IDENTIFIER>
    --role-session-name <SESSION-IDENTIFIER>
```

In this example, the command is issued to a security token service ("sts") that may be a part of or associated with the IAM service 207. The security token service issues cryptographically secure credentials or "tokens" that can be used to access the resources of the cloud provider network hosted on behalf the customer. The distributed application service 106 calls an "assume-role" API of the security token service, the call including a parameter (e.g., role-arn) identifying the role (e.g., "ROLE-IDENTIFIER") to be assumed and a parameter (e.g., role-session-name) identifying a session in which the role will be used (e.g., "SESSION-IDENTIFIER"). If the distributed application service 106 has permissions to assume that role, the security token service issues a temporary credential that the distributed application service 106 can use to perform certain management operations on behalf of the customer.

Note that in some examples, prior to the distributed application service 106 assuming the role indicated at circle 2, the IAM service 207 receives a request to add a role for the distributed application service 106 within the customer's access controls. As indicated at circle 2X, the distributed application service 106 can issue such a request. Such a request may be initiated upon the customer's first interaction with the distributed application service 106 or upon receiving the request at circle 1, for example. One exemplary request to link a service to a role in the customer's IAM access controls is shown below.

```
aws iam create-service-linked-role
    --aws-service-name <SERVICE-ID>
```

In this request, a "create-service-linked-role" API of the IAM service 207 is called, the call including a parameter (e.g., "aws-service-name") identifying the service (e.g., "SERVICE-NAME.amazonaws.com") to be granted a role, such as the name of the distributed application service 106. In other examples, the request to add a role for the service may originate from the electronic device 101 at the express initiation of the customer (not shown).

At circle 3, the distributed application service 106 issues one or more requests to the virtualization service 104 to grant itself permissions, using the previously assumed role, to perform operations on the customer's behalf and to perform operations to route inter-EL application node traffic across the customer's network.

In the following example request, the distributed application service 106 grants itself permission to associate the VPC carrying inter-node traffic with the local gateway of an EL. The request is issued to a "create-local-gateway-route-table-permission" API and the request parameters include an identifier of the local gateway (LGW-ID) and an identifier of the authorized account (SERVICE-ACCOUNT) that will be granted permissions (e.g., an identifier of an account of the distributed application service 106). The distributed application service 106 can issue one such request for the local gateway on each EL that will be part of the distributed cluster (e.g., local gateways 153-1 and 153-2 of FIG. 1).

```
aws ec2 create-local-gateway-route-table-permission
    --local-gateway-route-table-id <LGW-ID>
    --authorized-account-id <SERVICE-ACCOUNT>
```

In the following example request, the distributed application service 106 creates an association between the VPC carrying inter-node traffic and a local gateway of an EL. The request is issued to a "create-local-gateway-route-table-vpc-association" API and the request parameters include an identifier of the local gateway (LGW-ID) and an identifier of the VPC (VPC-ID). Again, the distributed application service 106 can issue one such request for the local gateway on each EL that will be part of the distributed cluster (e.g., local gateways 153-1 and 153-2 of FIG. 1).

```
aws ec2 create-local-gateway-route-table-vpc-association
    --local-gateway-route-table-id <LGW-ID>
    --vpc-id <VPC-ID>
```

In the following example request, the distributed application service 106 grants itself permission to access the customer's COIP data (e.g., COIP data 105). The request is issued to a "create-coip-pool-permission" API and the request parameters include an identifier of the COIP pool (COIP-POOL-ID) and an identifier of the authorized account (SERVICE-ACCOUNT) that will be granted permissions (e.g., an identifier of an account of the distributed application service 106).

```
aws ec2 create-coip-pool-permission
    --customer-owned-ipv4-pool-id <COIP-POOL-ID>
    --authorized-account-id <SERVICE-ACCOUNT>
```

In the following example request, the distributed application service 106 requests the allocation of an IP address from the customer's COIP pool to be later used in the network configuration of the distributed application node instances. The request is issued to a "allocate-address" API and the request parameters include an identifier of the customer's COIP pool (COIP-POOL-ID). The distributed application service 106 can issue one such request for each node in the distributed application cluster. In the example illustrated in FIG. 1, the distributed application service 106 can issue two such requests to obtain the COIP addresses 172.16.0.1 and 172.16.1.1 for the two nodes in the cluster.

```
aws ec2 allocate-address
    --customer-owned-ipv4-pool-id <COIP-POOL-ID>
```

In the following example request, the distributed application service 106 associates allocated COIP addresses with the ENIs linking the distributed application node instances to the VPC. The request is issued to a "allocate-address" API and the request parameters include an identifier of the address to be associated with an ENI (ALLOCATED_IP) and an identifier of an ENI (ENI-ID) associated with the instance. The distributed application service 106 can issue one such request for each node in the distributed application cluster. In the example illustrated in FIG. 1, the distributed application service 106 can issue two such requests to assign the COIP addresses 172.16.0.1 and 172.16.1.1 to the respective ENIs 166-1 and 166-2.

```
aws ec2 associate-address
    --allocation-id <ALLOCATED_IP>
    --network-interface-id <ENI-ID>
```

At circle 4, the virtualization service 104 can verify that the distributed application service 106 or its session has permissions to perform the above operations such as "create-local-gateway-route-table-vpc-association," "allocate-address," and "associate-address" by requesting verification from the IAM service 207, in some examples. The request can include at least one of a session identifier, an identifier of the service (e.g., an identifier of an account of the distributed application service 106), or a token previously issued to the distributed application service 106 and referenced or included with the above requests.

FIGS. 3-5 illustrate exemplary environments for inter-edge location distributed application communications. In the following figures, a distributed database ("DB") application is used as a representative example. The distributed database application can include a primary DB instance (or node) and one or more secondary (or standby) DB instances (or nodes). The inter-node traffic can include, amongst other things, replication data to allow transactions carried out with the primary DB instance to be mirrored at the secondary DB instance(s). The primary instance can be used during normal operations, while the secondary instances can be used in the event of the primary instance failure.

FIG. 3 is a diagram illustrating an environment for inter-edge location distributed application communications via a customer's VPC according to some examples. As illustrated, an EL 351-1 is homed to AZ 102-1 and an EL 351-2 is homed to AZ 102-2. Both ELs are installed within a customer network 350. EL 351-1 includes local gateway 353-1 and hosts the primary DB instance 301, while EL 351-2 includes local gateway 353-2 and hosts the standby DB instance 302.

The primary DB instance 301 is attached to a customer owned and managed VPC 314 via an ENI 316-1, while the standby DB instance 302 is attached to the customer VPC 314 via an ENI 316-5. The customer VPC 314 is typically the VPC into which the customer launches the distributed application, and, provided COIP address have been assigned to the cluster instances, may also serve as the ingress and egress point for other traffic originating from or destined to other devices (not shown) on the customer's network 350, such as an employee accessing the database via his or her personal computer. The customer VPC 314 has a CIDR block of 192.168.0.0/17, with a subnet 315-1 having block 192.168.0.0/24 associated with EL 351-1 and a subnet 315-2 having block 192.168.1.0/24 associated with EL 351-2.

Both DB instances 301 and 302 are also connected to a control VPC 324. The control VPC 324 is owned and managed by the managed service (e.g., the distributed application service 106) to provide the managed service with a management and/or monitoring communications pathway to the cluster nodes. In particular, the primary DB instance 301 is attached to the control VPC 324 via an ENI 326-1, while the standby DB instance 302 is attached to the control VPC 324 via an ENI 326-2. The control VPC 324 has subnets 325-1 and 325-2, each having address blocks as indicated. The managed service typically creates the control VPC 324 and attaches the nodes of the cluster to the control VPC via ENIs during the launch of the cluster.

The ENI 316-1 attaching the primary DB instance 301 to the customer VPC 314 has a VPC IP address of 192.168.0.0 and a COIP address 172.16.0.1. The ENI 316-2 attaching the standby DB instance 302 to the customer VPC 314 has a VPC IP address of 192.168.1.0 and a COIP address of 172.16.1.1.

In this example, the managed service (e.g., the distributed application service 106) leverages the customer-owned VPC 314 for inter-EL node traffic. The managed service updates the route tables 317-1 and 317-2 associated with subnets 315-1 and 315-2, respectively, to route traffic between cluster nodes via the customer network 350. In particular, the managed service updates the route table 317-1 to add a route to direct traffic destined to the customer network range not including the locally hosted primary DB instance 301 (172.16.1.0/24) onto the customer network 350 via the local gateway 353-1 (the route table target entry LGW 353-1 representative of an address of the local gateway 353-1). Likewise, the managed service updates the route table 317-2 to add a route to direct traffic destined to the customer network range not including the locally hosted standby DB instance 302 (172.16.0.0/24) onto the customer network 350 via the local gateway 353-2 (the route table target entry LGW 353-2 representative of an address of the local gateway 353-2).

One advantage of the approach illustrated in FIG. 3 is that the number of COIP addresses to assign to the cluster nodes can be reduced. For example, if the customer has already assigned COIP addresses to the instances to permit other traffic (e.g., originating from other devices within the customer network 350) to access the node(s) of the cluster, those same COIP addresses can be used for the inter-edge location distributed application communications. Thus, COIP address allocation operations such as described with respect to circle 3 of FIG. 1 and circle 3 of FIG. 2 can be omitted. However, the customer would be responsible for ensuring that the ports and protocols required by the distributed application for inter-node traffic are permitted across the customer's network.

FIG. 4 is a diagram illustrating an environment for inter-edge location distributed application communications via a service-owned control VPC according to some examples. As illustrated, an EL 451-1 is homed to AZ 102-1 and an EL 451-2 is homed to AZ 102-2. Both ELs are installed within a customer network 450. EL 451-1 includes local gateway 453-1 and hosts the primary DB instance 401, while EL 451-2 includes local gateway 453-2 and hosts the standby DB instance 402.

The primary DB instance 401 is attached to a customer owned and managed VPC 414, such as customer VPC 314 as described above, via an ENI 416-1, while the standby DB instance 402 is attached to the customer VPC 414 via an ENI 416-2. The customer VPC 414 has a CIDR block of 192.168.0.0/17, with a subnet 415-1 having block 192.168.0.0/24 associated with EL 451-1 and a subnet 415-2 having block 192.168.1.0/24 associated with EL 451-2.

Both DB instances 401 and 402 are also connected to a control VPC 424, such as the control VPC 324 described above. In particular, the primary DB instance 401 is attached to the control VPC 424 via an ENI 426-1, while the standby DB instance 402 is attached to the control VPC 424 via an ENI 426-2. The control VPC 324 has subnets 425-1 and 425-2, each having address blocks as indicated.

The ENI 426-1 attaching the primary DB instance 401 to the control VPC 424 has a VPC IP address of 172.17.0.0 and a COIP address 172.16.0.1. The ENI 426-2 attaching the standby DB instance 402 to the control VPC 424 has a VPC IP address of 172.17.1.0 and a COIP address of 172.16.1.1.

In this example, the managed service (e.g., the distributed application service 106) leverages the control VPC 424 for inter-EL node traffic. The managed service updates the route tables 427-1 and 427-2 associated with subnets 425-1 and 425-2, respectively, to route traffic between cluster nodes via the customer network 450. In particular, the managed service updates the route table 427-1 to add a route to direct traffic destined to the customer network range not including the locally hosted primary DB instance 401 (172.16.1.0/24) onto the customer network 450 via the local gateway 453-1 (the route table target entry LGW 453-1 representative of an address of the local gateway 453-1). Likewise, the managed service updates the route table 427-2 to add a route to direct traffic destined to the customer network range not including the locally hosted standby DB instance 402 (172.16.0.0/24) onto the customer network 450 via the local gateway 453-2 (the route table target entry LGW 453-2 representative of an address of the local gateway 453-2).

One advantage of the approach illustrated in FIG. 4 is that it uses an existing, managed service-owned VPC (i.e., the control VPC 424) for inter-EL node traffic. As a result, the managed service can ensure that the ports and protocols required by the distributed application are permitted via the VPC 424, reducing the customer's network management duties. However, such an approach exposes addresses of the control VPC 424 to the customer, allowing other devices on the customer network 450 to attempt to connect to processes listening on the ENIs 426-1 and 426-2.

FIG. 5 is a diagram illustrating an environment for inter-edge location distributed application communications via a service-owned inter-edge location virtual private cloud (VPC) according to some examples.

As illustrated, an EL 551-1 is homed to AZ 102-1 and an EL 551-2 is homed to AZ 102-2. Both ELs are installed within a customer network 550. EL 551-1 includes local gateway 553-1 and hosts the primary DB instance 501, while EL 551-2 includes local gateway 553-2 and hosts the standby DB instance 502.

The primary DB instance 501 is attached to a customer-owned and managed VPC 514, such as customer VPC 314 as described above, via an ENI 516-1, while the standby DB instance 502 is attached to the customer VPC 514 via an ENI 516-2. The customer VPC 514 has a CIDR block of 192.168.0.0/17, with a subnet 515-1 having block 192.168.0.0/24 associated with EL 551-1 and a subnet 515-2 having block 192.168.1.0/24 associated with EL 551-2.

Both DB instances 501 and 502 are also connected to a control VPC 524, such as the control VPC 324 described above. In particular, the primary DB instance 501 is attached to the control VPC 524 via an ENI 526-1, while the standby DB instance 502 is attached to the control VPC 524 via an ENI 526-2. The control VPC 524 has subnets 525-1 and 525-2, each having address blocks as indicated.

In this example, both DB instances 501 and 502 are also connected to a new, managed service-owned and managed VPC, marked inter-edge location VPC 534. The inter-edge location VPC 534 is another VPC in addition to the customer VPC 514 and the control VPC 524 that handles inter-EL node traffic. The ENI 536-1 attaching the primary DB instance 501 to the inter-edge location 534 has a VPC IP address 250.0.0.0 and a COIP address 172.16.0.1. The ENI 536-2 attaching the standby DB instance 502 to the inter-edge location VPC 534 has a VPC IP address 250.0.1.0 and a COIP address of 172.16.1.1.

In addition to creating the inter-edge location VPC 534, the managed service updates the route tables 537-1 and 537-2 associated with subnets 535-1 and 535-2, respectively, to route traffic between cluster nodes via the customer network 550. In particular, the managed service updates the route table 537-1 to add a route to direct traffic destined to the customer network range not including the locally hosted primary DB instance 501 (0.0.0.0) onto the customer network 550 via the local gateway 553-1 (the route table target entry LGW 553-1 representative of an address of the local gateway 553-1). Likewise, the managed service updates the route table 537-2 to add a route to direct traffic destined to the customer network range not including the locally hosted standby DB instance 502 (0.0.0.0) onto the customer network 550 via the local gateway 553-2 (the route table target entry LGW 553-2 representative of an address of the local gateway 553-2).

One advantage of the approach illustrated in FIG. 5 is that it uses a new, managed service-owned VPC (i.e., the inter-edge location VPC 534) for inter-EL node traffic. As a result, a default route (e.g., 0.0.0.0) in the route table can be used to route all traffic outside of the VPC 534 range. Such an approach reduces the customer's network management duties without exposing addresses of the control VPC 524 to the customer.

Figure 6:
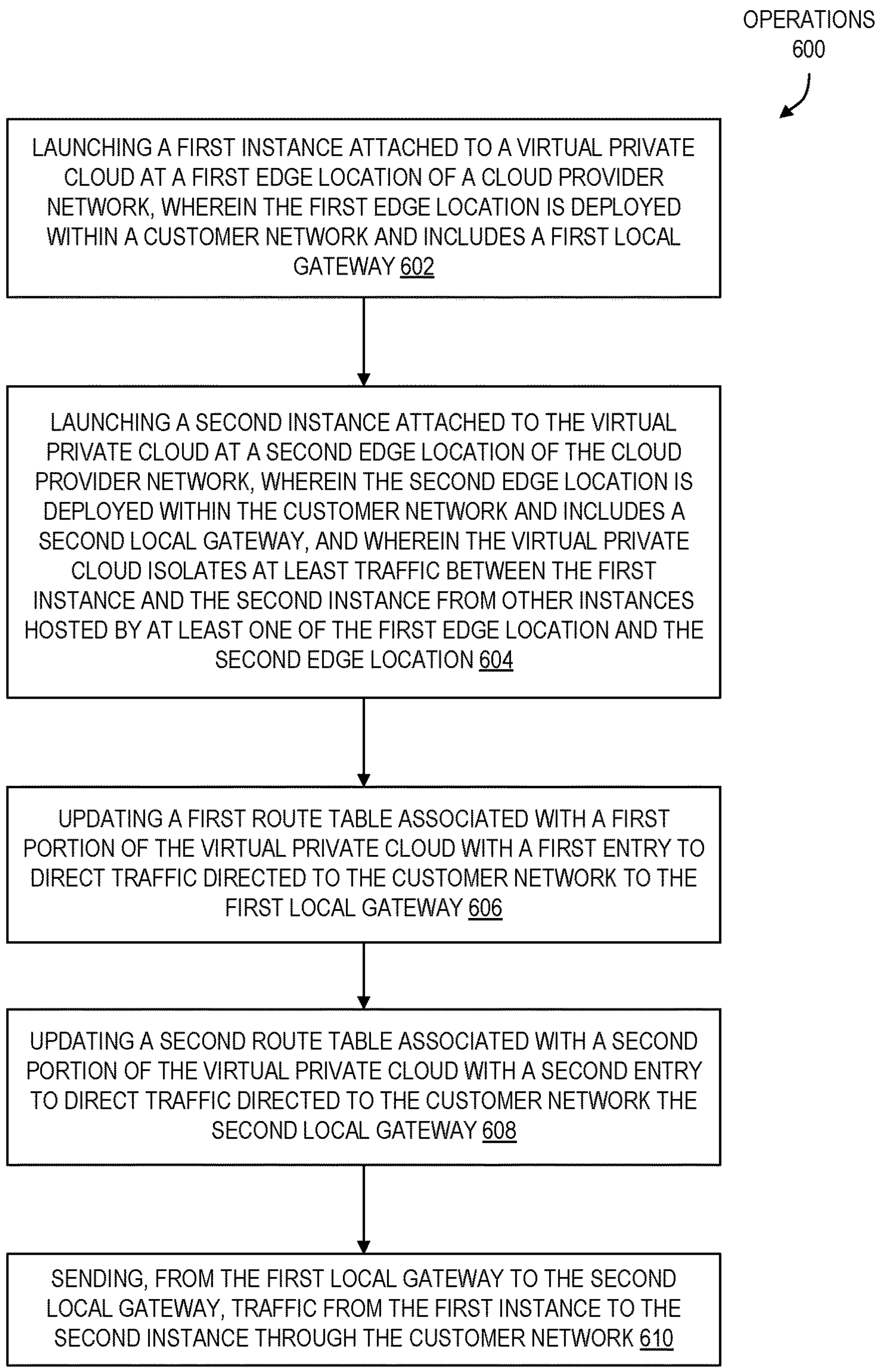
FIG. 6 is a flow diagram illustrating operations of a method for providing inter-edge location distributed application communications according to some examples.

FIG. 6 is a flow diagram illustrating operations of a method 600 for providing inter-edge location distributed application communications according to some examples. Some or all of the operations 600 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 600 are performed by a managed service (e.g., the distributed application service 106), the virtualization service 104, a local agent of an edge location (e.g., the local agent 155-1, the local agent 155-2), and/or a local gateway of an edge location (e.g., the local gateway 153-1, the local gateway 153-2) of the other figures, as described above.

The operations 600 include, at block 602, launching a first instance attached to a virtual private cloud at a first edge location of a cloud provider network, wherein the first edge location is deployed within a customer network and includes a first local gateway.

The operations 600 further include, at block 604, launching a second instance attached to the virtual private cloud at a second edge location of the cloud provider network, wherein the second edge location is deployed within the customer network and includes a second local gateway, and wherein the virtual private cloud isolates at least traffic between the first instance and the second instance from other instances hosted by at least one of the first edge location and the second edge location.

In some examples, the first instance and the second instance are a first node and a second node of a distributed application, such as a cluster computing or distributed database application.

The operations 600 further include, at block 606, updating a first route table associated with a first portion of the virtual private cloud with a first entry to direct traffic directed to the customer network to the first local gateway.

The operations 600 further include, at block 608, updating a second route table associated with a second portion of the virtual private cloud with a second entry to direct traffic directed to the customer network the second local gateway.

The operations 600 further include, at block 610, sending, from the first local gateway to the second local gateway, traffic from the first instance to the second instance through the customer network.

In some examples, the operations include granting a first request, received from a managed service of the cloud provider network, to permit the managed service to modify the first route table and receiving a second request, from the managed service and prior to updating the first route table, to add the first entry to the first route table. For example, a virtualization service such as the virtualization service can receive and grant such requests.

In some examples, the first edge location and the second edge location are connected to different availability zones of the cloud provider network, such as illustrated and described above.

In some examples, a virtualization service (e.g., the virtualization service 104) associates the first instance to the virtual private cloud with a first virtual network card or ENI, the first virtual network card having an associated internet protocol (IP) address allocated by the virtualization service from a pool of IP addresses within the customer network.

In some examples, the first portion of the virtual private cloud is a first subnetwork associated with the first edge location, and wherein the second portion of the virtual private cloud is a second subnetwork associated with the second edge location.

In some examples, the virtual private cloud is customer-owned and managed. In such cases, the operations 600 further include receiving a request from a customer to create the virtual private cloud.

In some examples, the virtual private cloud is a managed service-owned and managed VPC that provides communications between the managed service and the cluster. In such cases, the operations 600 further include receiving a request from a distributed application service of the cloud provider network to create the virtual private cloud and sending, from the distributed application service, control traffic to the first instance via the virtual private cloud.

In some examples, the virtual private cloud is a managed service-owned and managed VPC created to facilitate traffic amongst nodes hosted at edge locations. In such cases, the operations 600 further include receiving a request from a distributed application service of the cloud provider network to create the virtual private cloud, wherein the virtual private cloud is dedicated to network traffic routed between instances hosted on different edge locations and attached to the virtual private cloud.

In some examples, the first instance and the second instance are nodes of a distributed database, such as a primary replica and a standby or secondary replica of the distributed database.

In some examples, the traffic from the first instance destined to the second instance through the customer network includes a destination address corresponding to an internet protocol (IP) address allocated by a service of the cloud provider network to the second instance from a pool of IP addresses within the customer network.

Figure 7:
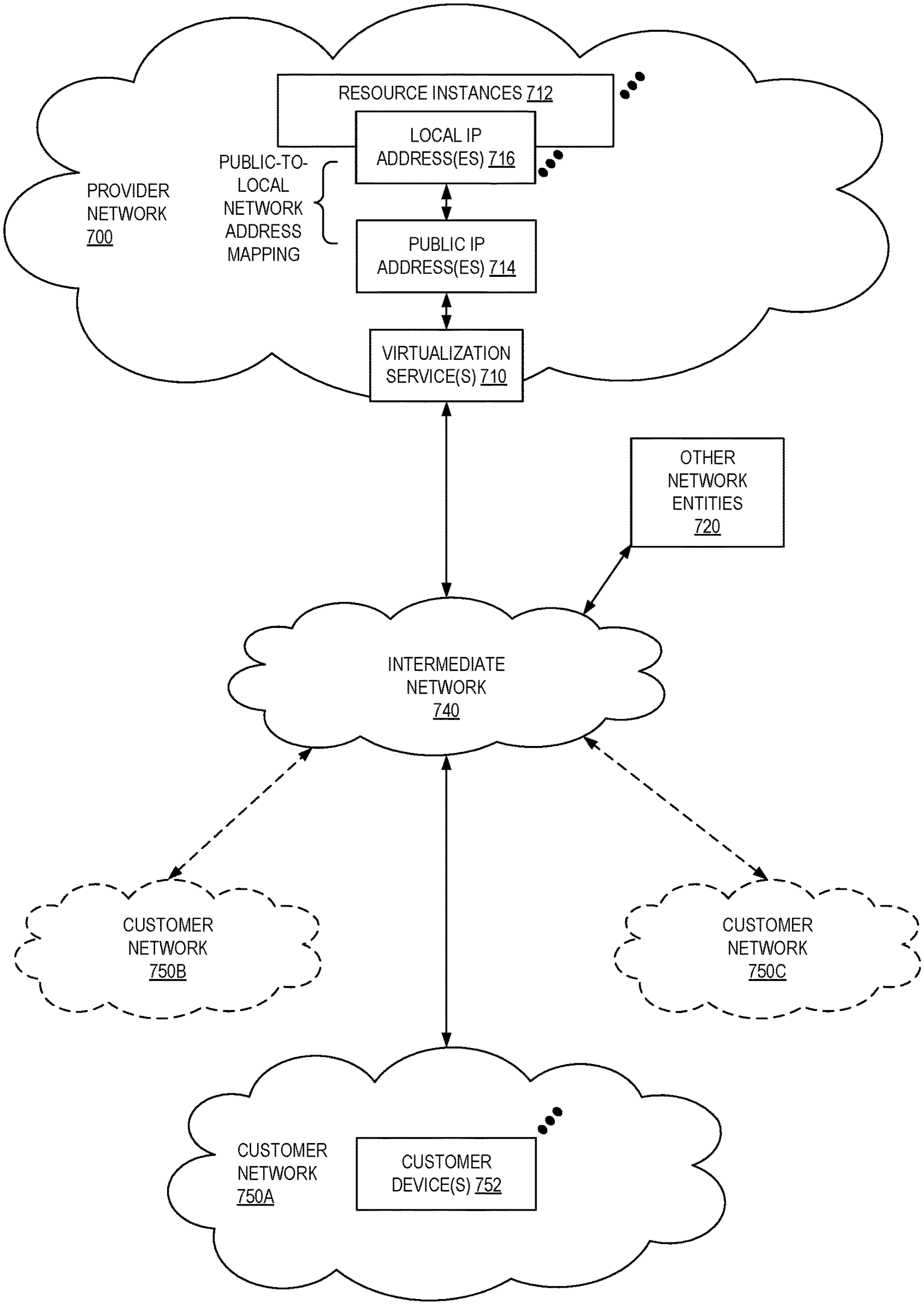
FIG. 7 illustrates an example provider network environment according to some examples.

FIG. 7 illustrates an example provider network (or "service provider system") environment according to some examples. A provider network 700 can provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 can be associated with the resource instances 712; the local IP addresses are the internal network addresses of the resource instances 712 on the provider network 700. In some examples, the provider network 700 can also provide public IP addresses 714 and/or public IP address ranges (e.g., Internet Protocol version 4 (IPv4) or Internet Protocol version 6 (IPv6) addresses) that customers can obtain from the provider 700.

Conventionally, the provider network 700, via the virtualization services 710, can allow a customer of the service provider (e.g., a customer that operates one or more customer networks 750A-750C (or "client networks") including one or more customer device(s) 752) to dynamically associate at least some public IP addresses 714 assigned or allocated to the customer with particular resource instances 712 assigned to the customer. The provider network 700 can also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of the customer network(s) 750A-750C can, for example, implement customer-specific applications and present the customer's applications on an intermediate network 740, such as the Internet. Other network entities 720 on the intermediate network 740 can then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 can be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 700; a customer can then assign their allocated public IP addresses to particular resource instances allocated to the customer. These public IP addresses can be referred to as customer public IP addresses, or simply customer IP addresses. Instead of being assigned by the provider network 700 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
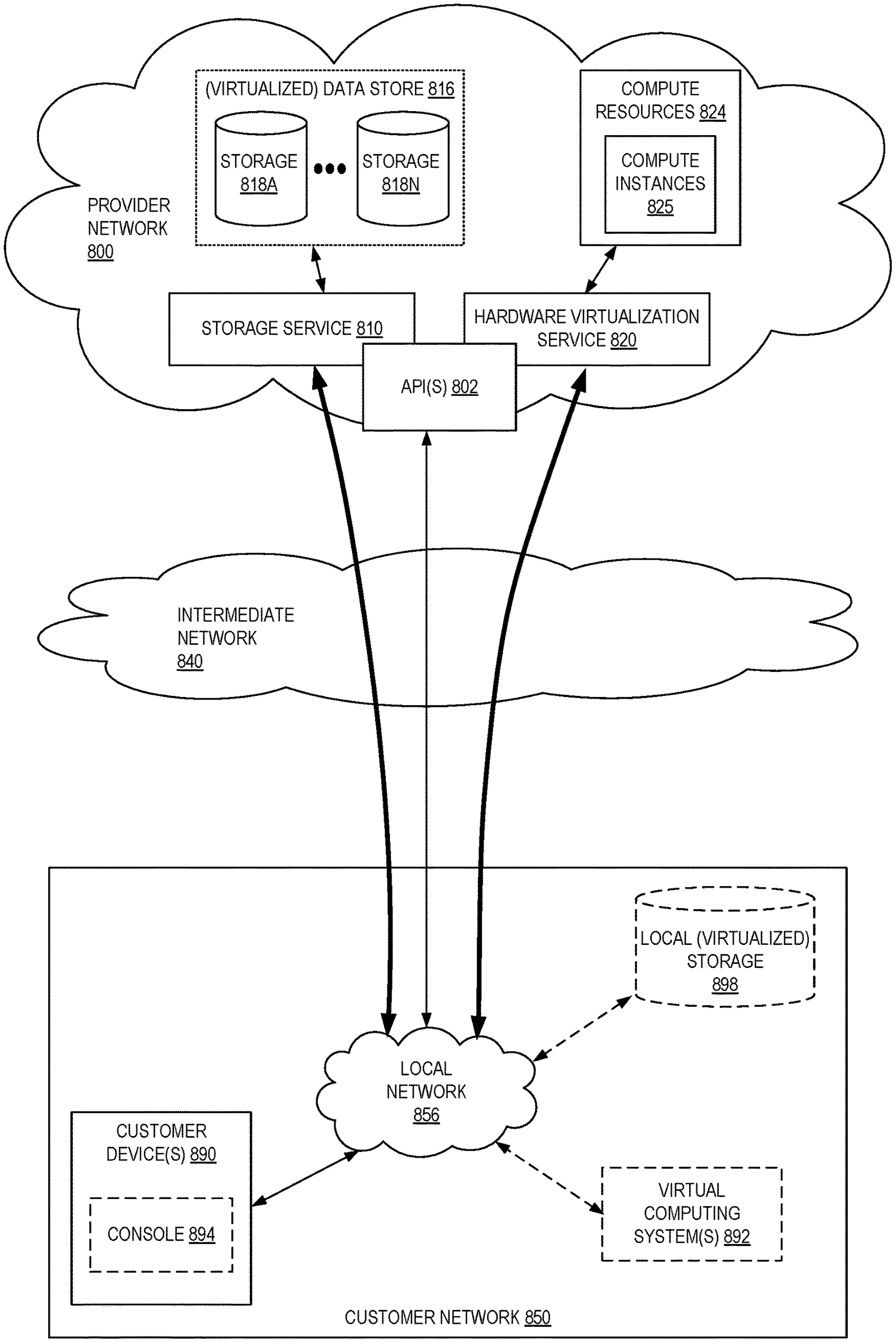
FIG. 8 is a block diagram of an example provider network that provides a storage service and a hardware virtualization service to customers according to some examples.

FIG. 8 is a block diagram of an example provider network environment that provides a storage service and a hardware virtualization service to customers, according to some examples. A hardware virtualization service 820 provides multiple compute resources 824 (e.g., compute instances 825, such as VMs) to customers. The compute resources 824 can, for example, be provided as a service to customers of a provider network 800 (e.g., to a customer that implements a customer network 850). Each computation resource 824 can be provided with one or more local IP addresses. The provider network 800 can be configured to route packets from the local IP addresses of the compute resources 824 to public Internet destinations, and from public Internet sources to the local IP addresses of the compute resources 824.

The provider network 800 can provide the customer network 850, for example coupled to an intermediate network 840 via a local network 856, the ability to implement virtual computing systems 892 via the hardware virtualization service 820 coupled to the intermediate network 840 and to the provider network 800. In some examples, the hardware virtualization service 820 can provide one or more APIs 802, for example a web services interface, via which the customer network 850 can access functionality provided by the hardware virtualization service 820, for example via a console 894 (e.g., a web-based application, standalone application, mobile application, etc.) of a customer device 890. In some examples, at the provider network 800, each virtual computing system 892 at the customer network 850 can correspond to a computation resource 824 that is leased, rented, or otherwise provided to the customer network 850.

From an instance of the virtual computing system(s) 892 and/or another customer device 890 (e.g., via console 894), the customer can access the functionality of a storage service 810, for example via the one or more APIs 802, to access data from and store data to storage resources 818A-818N of a virtual data store 816 (e.g., a folder or "bucket," a virtualized volume, a database, etc.) provided by the provider network 800. In some examples, a virtualized data store gateway (not shown) can be provided at the customer network 850 that can locally cache at least some data, for example frequently accessed or critical data, and that can communicate with the storage service 810 via one or more communications channels to upload new or modified data from a local cache so that the primary store of data (the virtualized data store 816) is maintained. In some examples, a user, via the virtual computing system 892 and/or another customer device 890, can mount and access virtual data store 816 volumes via the storage service 810 acting as a storage virtualization service, and these volumes can appear to the user as local (virtualized) storage 898.

While not shown in FIG. 8, the virtualization service(s) can also be accessed from resource instances within the provider network 800 via the API(s) 802. For example, a customer, appliance service provider, or other entity can access a virtualization service from within a respective virtual network on the provider network 800 via the API(s) 802 to request allocation of one or more resource instances within the virtual network or within another virtual network.

Illustrative Systems

Figure 9:
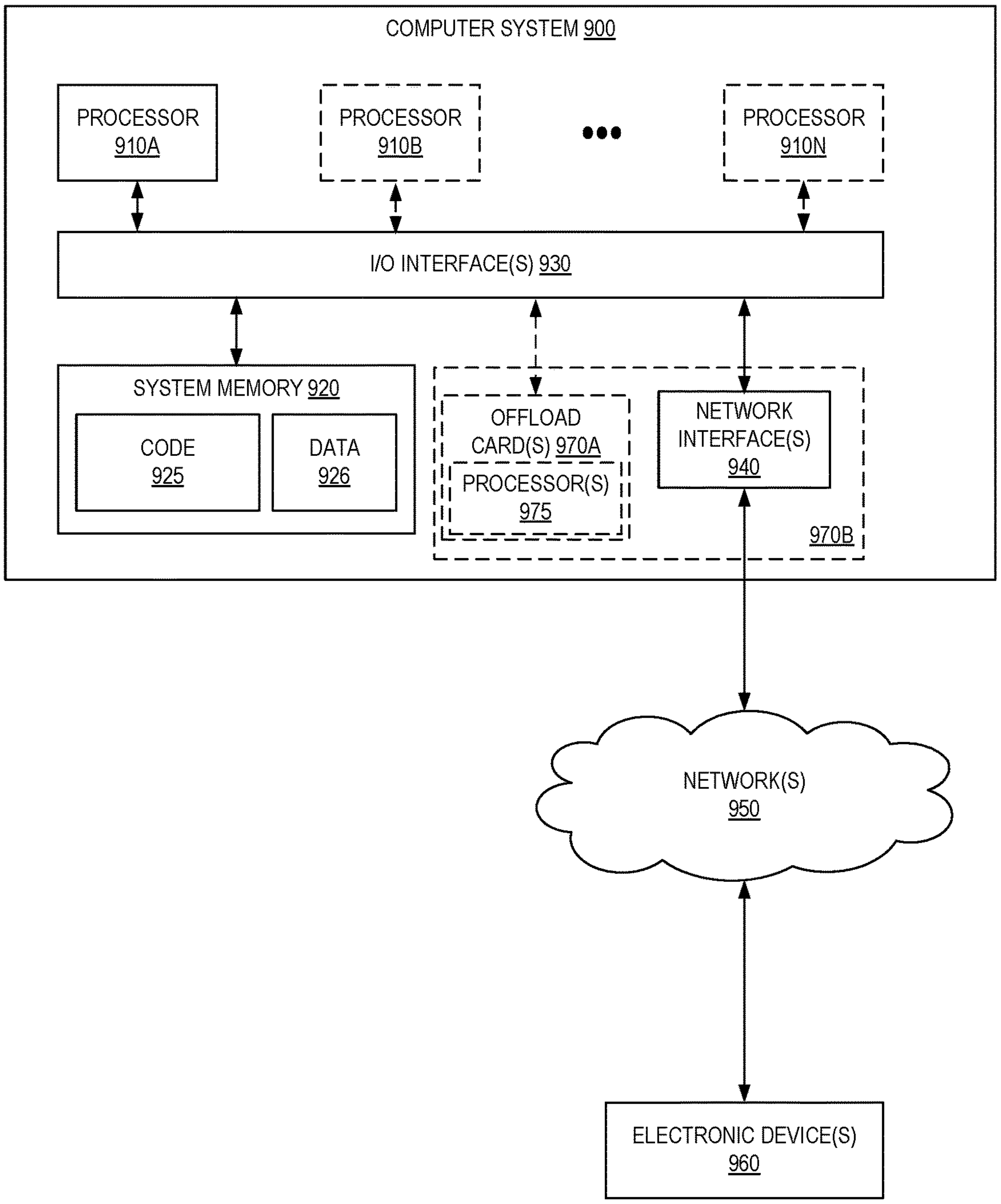
FIG. 9 is a block diagram illustrating an example computer system that can be used in some examples.

In some examples, a system that implements a portion or all of the techniques described herein can include a general-purpose computer system, such as the computer system 900 illustrated in FIG. 9, that includes, or is configured to access, one or more computer-accessible media. In the illustrated example, the computer system 900 includes one or more processors 910 coupled to a system memory 920 via an input/output (I/O) interface 930. The computer system 900 further includes a network interface 940 coupled to the I/O interface 930. While FIG. 9 shows the computer system 900 as a single computing device, in various examples the computer system 900 can include one computing device or any number of computing devices configured to work together as a single computer system 900.

In various examples, the computer system 900 can be a uniprocessor system including one processor 910, or a multiprocessor system including several processors 910 (e.g., two, four, eight, or another suitable number). The processor(s) 910 can be any suitable processor(s) capable of executing instructions. For example, in various examples, the processor(s) 910 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 910 can commonly, but not necessarily, implement the same ISA.

The system memory 920 can store instructions and data accessible by the processor(s) 910. In various examples, the system memory 920 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 920 as code 925 (e.g., executable to implement, in whole or in part, the distributed application service 106, the virtualization service 104, a local gateway 153, or an agent 155) and data 926.

In some examples, the I/O interface 930 can be configured to coordinate I/O traffic between the processor 910, the system memory 920, and any peripheral devices in the device, including the network interface 940 and/or other peripheral interfaces (not shown). In some examples, the I/O interface 930 can perform any necessary protocol, timing, or other data transformations to convert data signals from one component (e.g., the system memory 920) into a format suitable for use by another component (e.g., the processor 910). In some examples, the I/O interface 930 can include support for devices attached through various types of peripheral buses, such as a variant of the Peripheral Component Interconnect (PCI) bus standard or the Universal Serial Bus (USB) standard, for example. In some examples, the function of the I/O interface 930 can be split into two or more separate components, such as a north bridge and a south bridge, for example. Also, in some examples, some or all of the functionality of the I/O interface 930, such as an interface to the system memory 920, can be incorporated directly into the processor 910.

The network interface 940 can be configured to allow data to be exchanged between the computer system 900 and other devices 960 attached to a network or networks 950, such as other computer systems or devices as illustrated in FIG. 1, for example. In various examples, the network interface 940 can support communication via any suitable wired or wireless general data networks, such as types of Ethernet network, for example. Additionally, the network interface 940 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 900 includes one or more offload cards 970A or 970B (including one or more processors 975, and possibly including the one or more network interfaces 940) that are connected using the I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 900 can act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some examples the offload card(s) 970A or 970B can perform compute instance management operations, such as pausing and/or un-pausing compute instances, launching and/or terminating compute instances, performing memory transfer/copying operations, etc. These management operations can, in some examples, be performed by the offload card(s) 970A or 970B in coordination with a hypervisor (e.g., upon a request from a hypervisor) that is executed by the other processors 910A-910N of the computer system 900. However, in some examples the virtualization manager implemented by the offload card(s) 970A or 970B can accommodate requests from other entities (e.g., from compute instances themselves), and can not coordinate with (or service) any separate hypervisor.

In some examples, the system memory 920 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 900 via the I/O interface 930. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 900 as the system memory 920 or another type of memory. Further, a computer-accessible medium can include transmission media or signals such as electrical, electromagnetic, or digital signals, conveyed via a communication medium such as a network and/or a wireless link, such as can be implemented via the network interface 940.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 818A-818N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:

launching a first node of a distributed application on a first virtualized instance attached to a virtual private cloud at a first edge location outside a cloud provider network, wherein the first edge location is deployed within a customer network and includes a first local gateway, and wherein the customer network is separate from the cloud provider network;

providing the cloud provider network with one or more ranges of customer-owned IP ("COIP") addresses, wherein a service of the cloud provider network can allocate addresses from the COIP addresses to virtualized resources launched in the first edge location;

associating the first virtualized instance to the virtual private cloud with a first virtual network card, the first virtual network card having an associated internet protocol (IP) address allocated by the service of the cloud provider network from the COIP addresses, wherein the IP address of the first virtual network card is different from an IP address of the first virtualized instance;

launching a second node of the distributed application on a second virtualized instance attached to the virtual private cloud at a second edge location outside the cloud provider network, wherein the second edge location is deployed within the customer network and includes a second local gateway, and wherein the virtual private cloud isolates at least traffic between the first node and the second node from other instances hosted by at least one of the first edge location and the second edge location;

updating a first route table associated with a first subnetwork of the virtual private cloud with a first entry to direct traffic from the first node to the second node onto the customer network via the first local gateway;

updating a second route table associated with a second subnetwork of the virtual private cloud with a second entry to direct traffic from the second node to the first node onto the customer network via the second local gateway; and sending, from the first local gateway to the second local gateway, traffic from the first node to the second node through the customer network.

2. The computer-implemented method of claim 1, further comprising:

granting a first request, received from a managed service of the cloud provider network, to permit the managed service to modify the first route table; and receiving a second request, from the managed service and prior to updating the first route table, to add the first entry to the first route table.

3. The computer-implemented method of claim 1, wherein the first edge location and the second edge location are connected to different availability zones of the cloud provider network.

4. A computer-implemented method comprising:

launching a first instance attached to a virtual private cloud at a first edge location outside a cloud provider network, wherein the first edge location is deployed within a customer network and includes a first local gateway, and wherein the customer network is separate from the cloud provider network;

providing the cloud provider network with one or more ranges of customer-owned IP ("COIP") addresses, wherein a service of the cloud provider network can allocate addresses from the COIP addresses to virtualized resources launched in the first edge location;

associating the first instance to the virtual private cloud with a first virtual network card, the first virtual network card having an associated internet protocol (IP) address allocated by the service of the cloud provider network from a pool of IP the COIP addresses, wherein the IP address of the first virtual network card is different from an IP address of the first instance;

launching a second instance attached to the virtual private cloud at a second edge location outside the cloud provider network, wherein the second edge location is deployed within the customer network and includes a second local gateway, and wherein the virtual private cloud isolates at least traffic between the first instance and the second instance from other instances hosted by at least one of the first edge location and the second edge location;

updating a first route table associated with a first portion of the virtual private cloud with a first entry to direct traffic directed to the customer network to the first local gateway;

updating a second route table associated with a second portion of the virtual private cloud with a second entry to direct traffic directed to the customer network to the second local gateway; and sending, from the first local gateway to the second local gateway, traffic from the first instance to the second instance through the customer network.

5. The computer-implemented method of claim 4, further comprising:

granting a first request, received from a managed service of the cloud provider network, to permit the managed service to modify the first route table; and receiving a second request, from the managed service and prior to updating the first route table, to add the first entry to the first route table.

6. The computer-implemented method of claim 4, wherein the first edge location and the second edge location are connected to different availability zones of the cloud provider network.

7. The computer-implemented method of claim 4, wherein the first portion of the virtual private cloud is a first subnetwork associated with the first edge location, and wherein the second portion of the virtual private cloud is a second subnetwork associated with the second edge location.

8. The computer-implemented method of claim 4, further comprising receiving a request from a customer to create the virtual private cloud.

9. The computer-implemented method of claim 4, further comprising:

receiving a request from a distributed application service of the cloud provider network to create the virtual private cloud; and sending, from the distributed application service, control traffic to the first instance via the virtual private cloud.

10. The computer-implemented method of claim 4, further comprising receiving a request from a distributed application service of the cloud provider network to create the virtual private cloud, wherein the virtual private cloud is dedicated to network traffic routed between instances hosted on different edge locations and attached to the virtual private cloud.

11. The computer-implemented method of claim 4, wherein the first instance is a primary replica of a distributed database, and wherein the second instance is a standby replica of the distributed database.

12. The computer-implemented method of claim 4, wherein the traffic from the first instance to the second instance through the customer network includes a destination address corresponding to an internet protocol (IP) address allocated by a service of the cloud provider network to the second instance from a pool of IP addresses within the customer network.

13. A system comprising:

a first one or more electronic devices of a first edge location outside a cloud provider network, the first edge location deployed within a customer network that is separate from the cloud provider network, the first edge location including instructions to implement a first local gateway;

a second one or more electronic devices of a second edge location outside the cloud provider network, the second edge location deployed within the customer network, the second edge location including instructions to implement a second local gateway; and a third one or more electronic devices to implement a managed service in the cloud provider network, the managed service including instructions that upon execution cause the managed service to:

receive one or more ranges of customer-owned IP ("COIP") addresses, wherein the managed service of the cloud provider network can allocate addresses from the COIP addresses to virtualized resources launched in the first edge location;

launch a first instance attached to a virtual private cloud at the first edge location;

launch a second instance attached to the virtual private cloud at the second edge location, wherein the virtual private cloud isolates at least traffic between the first instance and the second instance from other instances hosted by at least one of the first edge location and the second edge location;

update a first route table associated with a first portion of the virtual private cloud with a first entry to direct traffic directed to the customer network to the first local gateway; and update a second route table associated with a second portion of the virtual private cloud with a second entry to direct traffic directed to the customer network to the second local gateway; and a fourth one or more electronic devices to implement a virtualization service in the cloud provider network, the virtualization service including instructions that upon execution cause the virtualization service to associate the first instance to the virtual private cloud with a first virtual network card, the first virtual network card having an associated internet protocol (IP) address allocated by the managed service of the cloud provider network from a pool of IP the COIP addresses, wherein the IP address of the first virtual network card is different from an IP address of the first instance; and wherein the instructions to implement the first local gateway further include instructions to cause traffic from the first instance to the second instance to be sent from the first local gateway to the second local gateway through the customer network.

14. The system of claim 13, wherein the virtualization service includes further instructions that upon execution further cause the virtualization service to:

grant a first request, received from the managed service, to permit the managed service to modify the first route table; and receive a second request, from the managed service and prior to updating the first route table, to add the first entry to the first route table.

15. The system of claim 13, wherein the first portion of the virtual private cloud is a first subnetwork associated with the first edge location and wherein the second portion of the virtual private cloud is a second subnetwork associated with the second edge location.

16. The system of claim 13, wherein the first edge location and the second edge location are connected to different availability zones of the cloud provider network.

17. The system of claim 13, wherein the virtualization service includes further instructions that upon execution further cause the virtualization service to create the virtual private cloud in response to a request from a customer.

18. The system of claim 13:

wherein the virtualization service includes further instructions that upon execution further cause the virtualization service to receive a request from the managed service of the cloud provider network to create the virtual private cloud; and wherein the managed service includes further instructions that upon execution cause the managed service to send control traffic to the first instance via the virtual private cloud.

19. The system of claim 13, wherein the virtualization service includes further instructions that upon execution further cause the virtualization service to create the virtual private cloud, wherein the virtual private cloud is dedicated to network traffic routed between instances hosted on different edge locations and attached to the virtual private cloud.

20. The system of claim 13, wherein the first instance is a primary replica of a distributed database, and wherein the second instance is a standby replica of the distributed database.

* * * * *